Feb. 2, 1965    H. LAMM    3,168,078
ROTARY PISTON COMBUSTION ENGINE SYSTEM
Filed Nov. 8, 1962    2 Sheets-Sheet 1

INVENTOR.
HEINZ LAMM
BY Dicke & Craig
ATTORNEYS

Feb. 2, 1965  H. LAMM  3,168,078
ROTARY PISTON COMBUSTION ENGINE SYSTEM
Filed Nov. 8, 1962  2 Sheets-Sheet 2

INVENTOR.
HEINZ LAMM
BY Dicke & Craig
ATTORNEYS

United States Patent Office 3,168,078
Patented Feb. 2, 1965

3,168,078
ROTARY PISTON COMBUSTION ENGINE SYSTEM
Heinz Lamm, Stuttgart-Bad Cannstatt, Germany, assignor to Daimler-Benz Aktiengesellschaft, Stuttgart-Unterturkheim, Germany
Filed Nov. 8, 1962, Ser. No. 236,206
Claims priority, application Germany, Nov. 15, 1961, D 37,455
16 Claims. (Cl. 123—8)

The present invention relates to a mixture-preparation in rotary piston internal combustion engines, especially in such engines as have a working chamber of trochoidal shape in cross section in which moves a piston in the shape of a triangle provided with arcuately-shaped working surfaces.

In internal combustion engines of this type, the preparation of the fuel-air mixture presents, as is known, great difficulties. The reason for these difficulties lies above all in the fact that only a relatively short time is available in order to sufficiently mix the drawn-in combustion air with the injected fuel. Even more difficult than with internal combustion engines having reciprocating pistons are the conditions with rotary piston internal combustion engines. With the latter type engines, the stream or flow is driven by the rotating piston principally in the circumferential direction against the compression wall of the working chamber. A sufficient eddying or vortexing of the fuel air mixture, however, does not take place under these conditions. With internal combustion engines having reciprocating pistons, on the other hand, the combustion air or the fresh gas is pressed frontally against the compression wall of the cylinder whereby it is much more simple from a constructive point of view to provide means and installations which effect a vortexing or eddying of the fresh gases.

In order to obtain a good preparation of the combustion mixture also with rotary piston internal combustion engines, it is proposed in accordance with the present invention to blow into the inflowing combustion air or into the inflowing fresh gas a sufficient quantity of the precompressed combustion air or fuel-air mixture or of the combustion gases, derived or taken from a phase of the working process of the engine itself, in the form of a disturbance stream or flow for the creation of a sufficient eddying or vortexing of the gases and fuel particles partaking in the subsequent combustion.

A large turbulence is achieved in accordance with the present invention by means of a cross- or counter-flow by disturbing the main stream or flow of the entering combustion air or fresh gases without loss in volumetric efficiency. Additional vortexing or eddying motions are produced by the impact of the flows or impingement of the streams against the rotating working piston and deflection thereof by the latter. The result of such an arrangement is a more favorable and a softer combustion which entails a lower specific fuel consumption. The loss in compression during overflow can be compensated at the outset by an increase in the compression ratio conditions so that output losses are avoided.

The present invention additionally entails the advantage that no external or independent compressed-air source is required for the operation of the rotary piston internal combustion engine.

Accordingly, it is an object of the present invention to provide a rotary piston internal combustion engine of the type described hereinabove which obviates by simple means the shortcomings encountered with the prior art constructions.

It is another object of the present invention to provide a rotary piston internal combustion engine in which by simple and inexpensive means, a highly improved fuel preparation is assured.

Still a further object of the present invention resides in the provision of a rotary piston internal combustion engine, especially of trochoidal construction, in which a high degree of vortexing or eddying of the combustion air or fuel air mixture is obtained without expensive installation.

Still another object of the present invention resides in the provision of a rotary piston internal combustion engine in which gases under pressure produced within the engine are used to produce a high degree of turbulence and therewith a high degree of good fuel preparation within the compression space without loss in engine output or sacrifice to the efficiency thereof.

A further object of the present invention resides in the provision of means producing a forced cross- and/or counter-flow into the combustion air or fuel air mixture present within the compression space of a rotary piston internal combustion engine which improves the fuel preparation and therewith reduces the specific fuel consumption of the engine without requiring any external sources for the compressed gases.

These and other objects, features and advantages of the present invention will become more obvious from the following description when taken in connection with the accompanying drawing which shows, for purposes of illustration only, several embodiments in accordance with the present invention, and wherein.

Figure 1:
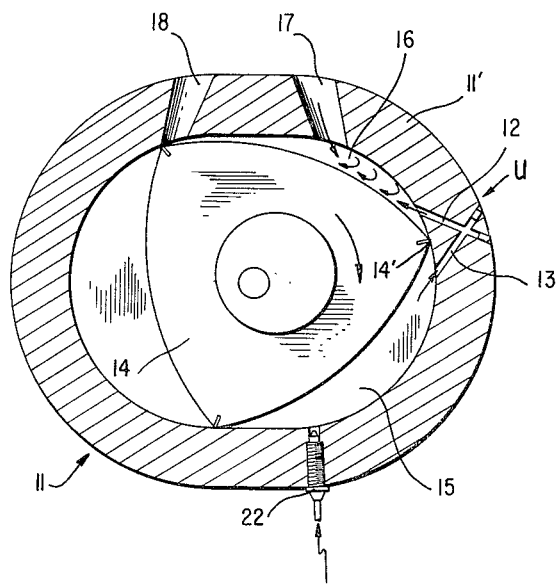
FIGURE 1 is a cross sectional view of a first embodiment of a rotary piston internal combustion engine in accordance with the present invention.

Referring now to the drawing wherein like reference numerals are used throughout the various views to designate like parts, and more particularly to FIGURE 1, reference numeral 11 generally designates therein the chamber walls of a rotary piston internal combustion engine of trochoidal construction which is provided with an overflow installation generally designated by reference character U. The overflow installation U consists of bores 12 and 13 arranged substantially one behind the other in the circumferential direction of which the discharge orifices or discharge apertures are controlled by the apices 14' of the working piston 14 during rotation of the latter. The overflow installation U is thereby arranged, as viewed in the direction of rotation, near the end of the trochoidal quarter 11' disposed on the inlet side in such a manner that after valving of the discharge aperture of the in-blow bore 12 by the piston apex 14', only a relatively small pressure differential exists between the compression space 15 and the suction space 16. Compressed air thereby flows for such length of time from the compression space 15 into the suction space 16 until the piston apex 14' has also valved the discharge aperture of the outflow bore 13. The discharge aperture of the inflow bore 12 is thereby so directed in relation to the inflowing direction of the combustion air, sucked-in through the channel 17, that a forceful vortexing or eddying takes place.

Figure 2:
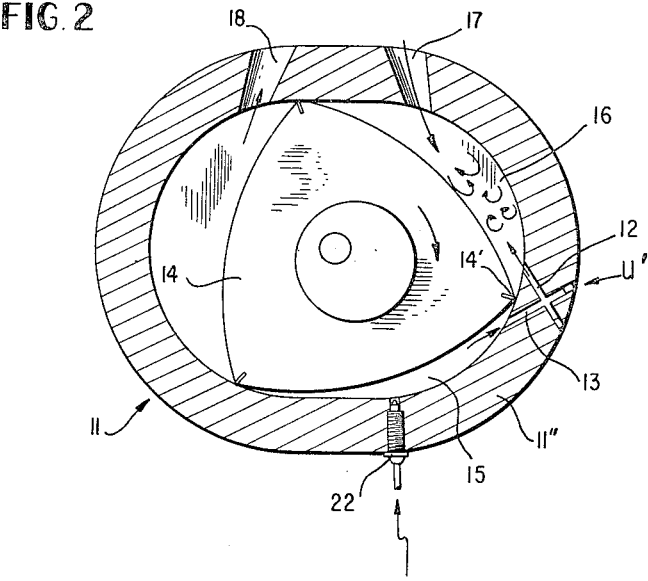
FIGURE 2 is a cross sectional view, similar to FIGURE 1, of a second embodiment of a rotary piston internal combustion engine in acordance with the present invention.

In FIGURE 2, the overflow installation designated by reference character U' is so arranged at the beginning of the second quarter 11" of the trochoid that during the overflow operation a higher pressure differential exists between the compression space 15 and the suction space 16.

In constructions according to the present invention, the pressure level is therefore given by the position of the overflow installation U or U' along the circumference of the trochoid between the compression space 15 and the suction space 16 whereas the length of operating time during which the disturbance air is blown into the suction space 16 is determined by the distance, along the circumference of the trochoid, between the orifice of the inflow or inblowing bore 12 and of the outflow bore 13.

Figure 3:
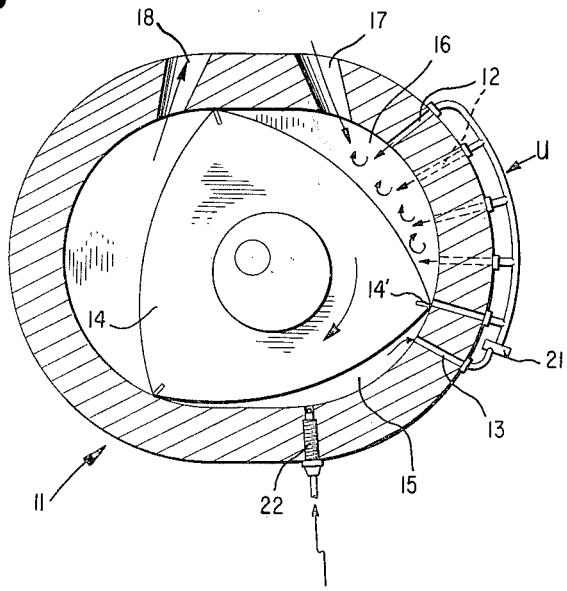
FIGURE 3 is a cross sectional view, similar to FIGURES 1 and 2, of a third embodiment of a rotary piston internal combustion engine in accordance with the present invention.

The overflow installation generally designated by reference character U consists in FIGURE 3 of several inflow bores 12 arranged within the suction space 16 which are supplied by an outflow bore 13 disposed within the compression space 15. A check valve 21 of any suitable conventional construction is thereby installed between the outflow bore 13 and the inblowing bores 12 which opens only at a predetermined pressure level and only in the direction toward the suction space 16. The intensity and configuration of the produced vortex or eddying motion may be determined by the inblow bores 12 discharging into the suction space 16 at the circumference of the chamber wall one after the other whereby the discharge apertures of the individual bores 12 may be directed differently to each other.

Figure 4:
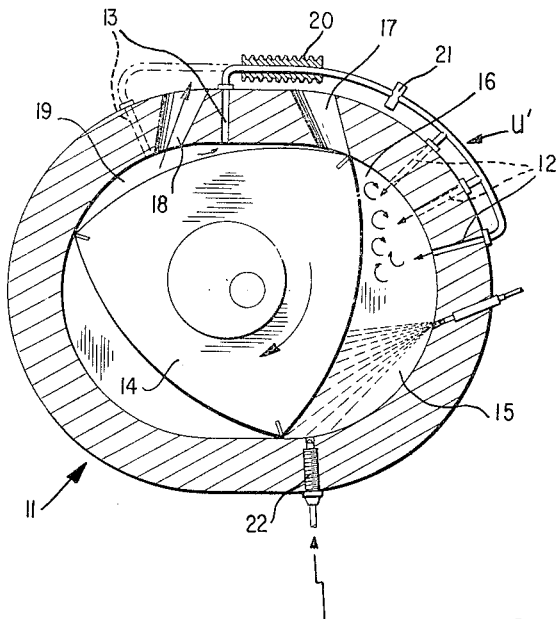
FIGURE 4 is a cross sectional view, similar to FIGURES 1, 2 and 3, of a still further modified embodiment of a rotary piston internal combustion engine in accordance with the present invention.

In the embodiment of FIGURE 4, a certain quantity of combustion gases is taken out of the expansion space 19 and is blown, by way of an installation generally designated by reference character U', into the suction space 16 as disturbance flow for the creation of a sufficient eddying or vortexing movement. The outflow bore 13 disposed within the expansion space 19 may thereby be disposed in front of and/or to the rear of the outlet or exhaust channel 18. A cooling arrangement of any suitable construction and designated by reference numeral 20 is provided within the overflow installation U' which brings the overflowing hot combustion gases to the temperature desired for the inblowing operation. A check valve 21 is also installed into this embodiment which opens only above a predetermined pressure level and does not permit any back-flow of gases from the suction space 16.

The arrangement of FIGURE 4 is also suited to produce a stratified charge within the compression and/or combustion space in a manner known per se, that is, to provide within the region of the spark plug 22 a rich mixture which is readily ignitable and within the area remote from the spark plug a lean mixture.

While I have shown and described several embodiments in accordance with the present invention, it is understood that the same is not limited thereto, but is susceptible of many changes and modifications within the spirit and scope of a person skilled in the art, and I therefore do not wish to be limited to the details shown and described herein, but intend to cover all such changes and modifications as are encompassed by the scope of the appended claims.

I claim:
1. A rotary piston internal combustion engine, especially of the type having a trochoidally-shaped working chamber in cross section, comprising:
housing means forming said working chamber,
polygonal piston means within said housing means and having a plurality of apices and approximately arcuately-shaped working surfaces with the apices in substantially continuous contact along the internal surface of said housing means,
means for supporting said piston means for rotary movement within said housing means in such a manner that a plurality of relatively small substantially sickle-shaped spaces are formed of varying volume corresponding to the different phases of the operation of the engine and effectively providing a suction space, a compression space and an expansion space,
inlet and outlet channel means within said housing means for controlling the gas exchange of the engine,
and means for imparting to the inflowing combustion stream admitted through said inlet channel means an eddying motion including means for deriving a fluid pre-compressed within said engine from one of the phases of the operation of the engine consisting of the compression phase and the expansion phase and blowing said fluid into the inflowing stream in the form of a disturbance flow for producing said eddying motion.

2. A rotary piston internal combustion engine, especially of the type having a trochoidally-shaped working chamber in cross section, comprising:
housing means forming said working chamber,
polygonal piston means within said housing means and having a plurality of apices and substantially arcuately-shaped working surfaces,
means for supporting said piston means for rotary movement within said housing means in such a manner that a plurality of relatively small working spaces are effectively formed of varying volume and corresponding to the different phases of the operation of the engine including a suction space, a compression space and an expansion space,
inlet and outlet channel means within said housing means for controlling the gas exchange of the engine,
and means including over-flow means between said suction space and one of the two spaces consisting of compression and expansion space for imparting to the inflowing combustion stream admitted through the inlet channel means an eddying motion by blowing into said stream gases, pre-compressed within said engine from one of the phases of the operation of the engine, in the form of a disturbance flow for producing said eddying motion,
said over-flow means including outflow and in-blowing bore means operatively connected with each other and arranged one behind the other in the circumferential direction of the working chamber walls of said housing means,
said outflow and in-blowing bore means being controlled by the piston apex passing the same.

3. A rotary piston internal combustion engine, especially of the type having a trochoidally-shaped working chamber in cross section, comprising:
housing means forming said working chamber,
polygonal piston means within said housing means and having a plurality of apices and substantially arcuately-shaped working surfaces,
means for supporting said piston means for rotary movement within said housing means in such a manner that a plurality of relatively small working spaces are effectively formed of varying volume and corresponding to the different phases of the operation of the engine including a suction space, a compression space and an expansion space,
inlet and outlet channel means within said housing means for controlling the gas exchange of the engine,
and means including over-flow means between said suction space and one of the two spaces consisting of compression and expansion space for imparting to the inflowing combustion steam admitted through the inlet channel means an eddying motion by blowing into said stream gases, pre-compressed within said engine from one of the phases of the operation of the engine, in the form of a disturbance flow for producing said eddying motion,
said overflow means including outflow and in-blowing bore means operatively connected with each other and arranged one behind the other in the circumferential direction of the working chamber walls of said housing means, said outflow and in-blowing bore means being controlled by the piston apex passing the same, and said outflow and in-blowing bores means consisting of one outflow bore in one of the said two spaces and a plurality of bores in said suction space.

4. A rotary piston internal combustion engine, especially of the type having a trochoidally-shaped working chamber in cross section, comprising:

housing means forming said working chamber, polygonal piston means within said housing means and having a plurality of apices and substantially arcuately-shaped working surfaces, means for supporting said piston means for rotary movement within said housing means in such a manner that a plurality of relatively small working spaces are effectively formed of varying volume and corresponding to the different phases of the operation of the engine including a suction space, a compression space and an expansion space, inlet and outlet channel means within said housing means for controlling the gas exchange of the engine, and means including over-flow means between said suction space and one of the two spaces consisting of compression and expansion space for imparting to the inflowing combustion stream admitted through the inlet channel means an eddying motion by blowing into said stream gases, pre-compressed within said engine from one of the phases of the operation of the engine, in the form of a disturbance flow for producing said eddying motion, said over-flow means including outflow and in-blowing bore means operatively connected with each other and arranged one behind the other in the circumferential direction of the working chamber walls of said housing means, said outflow and in-blowing bore means being controlled by the piston apex passing the same, and said outflow and in-blowing bores means consisting of one outflow bore in one of the said two spaces and a plurality of bores in said suction space, and pressure-controlled check-valve means operatively connected into said over-flow means which opens only in the presence of a predetermined pressure in the direction toward the suction space.

5. A rotary piston internal combustion engine, especially of the type having a trochoidally-shaped working chamber in cross section, comprising:

housing means forming said working chamber, polygonal piston means within said housing means and having a plurality of apices and substantially arcuately-shaped working surfaces, means for supporting said piston means for rotary movement within said housing means in such a manner that a plurality of relatively small working spaces are effectively formed of varying volume and corresponding to the different phases of the operation of the engine including a suction space, a compression space and an expansion space, inlet and outlet channel means within said housing means for controlling the gas exchange of the engine, and means including over-flow means between said suction space and one of the two spaces consisting of compression and expansion space for imparting to the inflowing combustion stream admitted through the inlet channel means an eddying motion by blowing into said stream gases, pre-compressed within said engine from one of the phases of the operation of the engine, in the form of a disturbance flow for producing said eddying motion, said over-flow means including outflow and in-blowing bore means operatively connected with each other and arranged one behind the other in the circumferential direction of the working chamber walls of said housing means, said outflow and in-blowing bore means being controlled by the piston apex passing the same, and cooling means in said over-flow means for reducing the temperature of the in blown gases.

6. In rotary piston internal combustion engines, especially those having a working chamber of trochoidal shape in cross section in which a piston in the form of a polygon with curved working surfaces moves within the working chamber to effectively form small spaces of varying volume during rotation of the engine and effectively provides thereby a plurality of spaces for the different phases of the operation of the engine including a suction phase, a compression phase and an expansion phase, the improvement essentially consisting of a system for improving the mixture preparation within the engine comprising means for blowing into the in-flowing combustion stream a sufficient quantity of gaseous medium, previously compressed within the engine and derived from a phase of the operation of the engine itself, in the form of a disturbance flow for the production of a vortexing of the inflowing stream.

7. A rotary piston internal combustion engine, especially of the type having a trochoidally-shaped working chamber in cross section, comprising:

housing means forming said working chamber, polygonal piston means within said housing means and having a plurality of apices and substantially arcuately-shaped working surfaces, means for supporting said piston means for rotary movement within said housing means in such a manner that a plurality of relatively small working spaces are effectively formed of varying volume and corresponding to the different phases of the operation of the engine including a suction space, a compression space and an expansion space, inlet and outlet channel means within said housing means for controlling the gas exchange of the engine, and means including over-flow means between said suction space and one of the two spaces consisting of compression and expansion space for imparting to the inflowing combustion stream admitted through the inlet channel means an eddying motion by blowing into said stream gases, pre-compressed within said engine from one of the phases of the operation of the engine, in the form of a disturbance flow for producing said eddying motion, said over-flow means including outflow and in-blowing bore means operatively connected with each other and arranged one behind the other in the circumferential direction of the working chamber walls of said housing means, said outflow and in-blowing bore means being controlled by the piston apex passing the same, and said outflow and in-blowing bores means consisting of one outflow bore in one of the said two spaces and a plurality of bores in said suction space, and pressure-controlled check-valve means operatively connected into said over-flow means to the rear of the outflow bore means which opens only in the presence of a predetermined pressure in the direction toward the suction space, and cooling means in said over-flow means to the rear of the outflow bore means for reducing the temperature of the in blown gases.

8. In rotary piston internal combustion engines, especially those having a working chamber of trochoidal shape in cross section in which a piston in the form of a polygon with curved working surfaces moves within the working chamber to effectively form small spaces of varying volume during rotation of the engine and effectively provides thereby a plurality of spaces for the different phases of the operation of the engine including a suction phase, a compression phase and an expansion phase, the improvement essentially consisting of means for improving the mixture preparation within the engine comprising means for producing a vortexing movement of the fresh combustion inflow by directing toward said inflow a gaseous charge under pressure in the form of a disturbance flow.

9. A rotary piston internal combustion engine, especially of the type having a trochoidally-shaped working chamber in cross section, comprising:

housing means forming said working chamber, polygonal piston means within said housing means and having a plurality of apices and substantially arcuately-shaped working surfaces, means for supporting said piston means for rotary movement within said housing means in such a manner that a plurality of relatively small working spaces are effectively formed of varying volume and corresponding to the different phases of the operation of the engine including a suction space, a compression space and an expansion space, inlet and outlet channel means within said housing means for controlling the gas exchange of the engine, and means including over-flow means between said suction space and one of the two spaces consisting of compression and expansion space for imparting to the inflowing combustion stream admitted through the inlet channel means an eddying motion by blowing into said stream gases, pre-compressed within said engine from one of the phases of the operation of the engine, in the form of a disturbance flow for producing said eddying motion.

said over-flow means including outflow and in-blowing bore means operatively connected with each other and arranged one behind the other in the circumferential direction of the working chamber walls of said housing means, said outflow and in-blowing bore means being controlled by the piston apex passing the same, and pressure-controlled check-valve means operatively connected into said over-flow means which opens only in the presence of a predetermined pressure in the direction toward the suction space.

10. In rotary piston internal combustion engines, especially those having a working chamber of trochoidal shape in cross section in which a piston in the form of a polygon with curved working surfaces moves within the working chamber to effectively form small spaces of varying volume during rotation of the engine and effectively provides thereby a plurality of spaces for the different phases of the operation of the engine including a suction phase, a compression phase and an expansion phase, the improvement essentially consisting of means for improving the mixture preparation within the engine comprising means for producing a vortexing movement of the fresh combustion inflow by directing toward said inflow a gaseous charge under pressure in the form of a disturbance flow including outlet bore means in communication with the pressure space and inlet bore means in communication with said outlet bore means and discharging into the suction space whereby the length of overflow time is determined by the distance of said bore means from each other in the circumferential direction.

11. In rotary piston internal combustion engines, especially those having a working chamber of trochoidal shape in cross section in which a piston in the form of a polygon with curved working surfaces moves within the working chamber to effectively form small spaces of varying volume during rotation of the engine and effectively provides thereby a plurality of spaces for the different phases of the operation of the engine including a suction phase, a compression phase and an expansion phase, the improvement essentially consisting of a system for improving the mixture preparation within the engine comprising means for blowing into the in-flowing combustion air a sufficient quantity of gaseous medium, previously compressed within the engine and derived from a phase of the operation of the engine itself, in the form of a disturbance flow for the production of a vortexing of the in-flowing combustion air, said system including outflow bore means having discharge means disposed in the compression space and inblowing bore means having discharge means disposed in the suction space, and the discharge means being provided near the end of the first trochoid quarter coordinated to the inlet channel.

12. In rotary piston internal combustion engines, especially those having a working chamber of trochoidal shape in cross section in which a piston in the form of a polygon with curved working surfaces moves within the working chamber to effectively form small spaces of varying volume during rotation of the engine and effectively provides thereby a plurality of spaces for the different phases of the operation of the engine including a suction phase, a compression phase and an expansion phase, the improvement essentially consisting of a system for improving the mixture preparation within the engine comprising means for blowing into the in-flowing combustion air a sufficient quantity of gaseous medium, previously compressed within the engine and derived from a phase of the operation of the engine itself, in the form of a disturbance flow for the production of a vortexing of the in-flowing combustion air, said system including outflow bore means having discharge means disposed in the compression space and inblowing bore means having discharge means disposed in the suction space, and the discharge means being provided near the beginning of the second trochoid quarter.

13. In rotary piston internal combustion engines, especially those having a working chamber of trochoidal shape in cross section in which a piston in the form of a polyogn with curved working surfaces moves within the working chamber to effectively form small spaces of varying volume during rotation of the engine and effectively provides thereby a plurality of spaces for the different phases of the operation of the engine including a suction space, a compression space and an expansion space, the improvement essentially consisting of a system for improving the mixture preparation within the engine comprising means for blowing into the in-flowing combustion air a sufficient quantity of gaseous medium, previously compressed within the engine and derived from a phase of the operation of the engine itself, in the form of a disturbance flow for the production of a vortexing of the in-flowing combustion air, said system including outflow bore means in communication with the compression space, in-blowing bore means discharging into the suction space, and connecting means operatively connecting with each other said outflow and in-blowing bore means provided with check valve means.

14. In rotary piston internal combustion engines, especially those having a working chamber of trochoidal shape in cross-section in which a piston in the form of a polygon with curved working surfaces moves within the working chamber to effectively form small spaces of varying volume during rotation of the engine and effectively provides thereby a plurality of spaces for the different phases of the operation of the engine including a suction space, a compression space and an expansion space, the improvement essentially consisting of a system for improving the mixture preparation within the engine comprising means for blowing into the in-flowing combustion air a sufficient quantity of gaseous medium, previously compressed within the engine and derived from a phase of the operation of the engine itself, in the form of a disturbance flow for the production of a vortexing of the in-flowing combustion air, said system including outflow bore means in communication with the expansion space, in-blowing bore means discharging into the suction space, and connecting means operatively connecting with each other said outflow and in-blowing bore means provided with check valve means and cooling means.

15. A rotary piston internal combustion engine, especially of the type having a trochoidally-shaped working chamber in cross section, comprising:

housing means forming said working chamber, polygonal piston means within said housing means and having a plurality of apices and substantially arcuately-shaped working surfaces, means for supporting said piston means for rotary movement within said housing means in such a manner that a plurality of relatively small working spaces are effectively formed of varying volume and corresponding to the different phases of the operation of the engine including a suction space, a compression space and an expansion space, inlet and outlet channel means within said housing means for controlling the gas exchange of the engine, and means including over-flow means between said suction space and one of the two spaces consisting of compression and expansion space for imparting to the inflowing combustion stream admitted through the inlet channel means an eddying motion by blowing into said stream gases, pre-compressed within said engine from one of the phases of the operation of the engine, in the form of a disturbance flow for producing said eddying motion, said over-flow means including outflow and in-blowing bore means operatively connected with each other and arranged one behind the other in the circumferential direction of the working chamber walls of said housing means, said outflow and in-blowing bore means being controlled by the piston apex passing the same, and cooling means in said over-flow means to the rear of the outflow bore means for reducing the temperature of the in blown gases.

16. A rotary piston internal combustion engine, especially of the type having a trochoidally-shaped working chamber in cross section, comprising:

housing means forming said working chamber, polygonal piston means within said housing means and having a plurality of apices and substantially arcuately-shaped working surfaces, means for supporting said piston means for rotary movement within said housing means in such a manner that a plurality of relatively small working spaces are effectively formed of varying volume and corresponding to the different phases of the operation of the engine including a suction space, a compression space and an expansion space, inlet and outlet channel means within said housing means for controlling the gas exchange of the engine, and means including over-flow means between said suction space and one of the two spaces consisting of compression and expansion space for imparting to the inflowing combustion stream admitted through the inlet channel means an eddying motion by blowing into said stream gases, pre-compressed within said engine from one of the phases of the operation of the engine, in the form of a disturbance flow for producing said eddying motion, said over-flow means including outflow and in-blowing bore means operatively connected with each other and arranged one behind the other in the circumferential direction of the working chamber walls of said housing means, said outflow and in-blowing bore means being controlled by the piston apex passing the same, and pressure-controlled check-valve means operatively connected into said over-flow means to the rear of the outflow bore means which opens only in the presence of a predetermined pressure in the direction toward the suction space.

References Cited in the file of this patent

UNITED STATES PATENTS 3,097,632     Froede et al. _____ July 16, 1963